(12) United States Patent
Do

(10) Patent No.: US 6,989,947 B2
(45) Date of Patent: Jan. 24, 2006

(54) IMAGING LENS

(75) Inventor: Satoshi Do, 1-2-56 Miyado, Asaki-shi, 351-0031, Saitama (JP)

(73) Assignees: Milestone Co., Ltd., Saitama (JP); Satoshi Do, Tokyo (JP)

( * ) Notice: Subject to any disclaimer, the term of this patent is extended or adjusted under 35 U.S.C. 154(b) by 0 days.

(21) Appl. No.: 10/794,027

(22) Filed: Mar. 8, 2004

(65) Prior Publication Data
US 2005/0128334 A1    Jun. 16, 2005

(30) Foreign Application Priority Data
Dec. 12, 2003  (JP) ............................. 2003-414288

(51) Int. Cl.
  *G02B 9/12*  (2006.01)
(52) U.S. Cl. ...................... 359/791; 359/740
(58) Field of Classification Search ................ 359/791, 359/784, 771, 773, 779–780, 763–764, 766–769, 359/754–760, 738–740
See application file for complete search history.

(56) References Cited
U.S. PATENT DOCUMENTS

| | | | |
|---|---|---|---|
| 6,379,004 B1 | 4/2002 | Walther et al. | |
| 6,795,253 B2 * | 9/2004 | Shinohara | 359/716 |
| 6,804,067 B2 * | 10/2004 | Sato | 359/784 |
| 2002/0012176 A1 | 1/2002 | Ning | |
| 2002/0171121 A1 | 12/2002 | Kawakami | |
| 2003/0210475 A1 | 11/2003 | Shinohara | |
| 2004/0179275 A1 * | 9/2004 | Takeuchi et al. | 359/791 |

FOREIGN PATENT DOCUMENTS

| | | |
|---|---|---|
| EP | 1 348 990 A1 | 10/2003 |
| JP | 07/325253 | 12/1995 |
| JP | 02/006917 | 4/1998 |
| JP | 10-301021 | 11/1998 |
| JP | 10-301022 | 11/1998 |
| JP | 2001-075006 | 3/2001 |
| JP | 2002-221659 | 8/2002 |
| JP | 2002-244030 | 8/2002 |
| JP | 2003-149545 | 5/2003 |
| JP | 2003-149548 | 5/2003 |
| JP | 2003-322792 | 11/2003 |

* cited by examiner

*Primary Examiner*—Jordan M. Schwartz
(74) *Attorney, Agent, or Firm*—James R. Burdett; Venable, LLP

(57) ABSTRACT

The present invention is an imaging lens in which various aberrations are satisfactorily corrected, the optical length is short, and a sufficient back focus is secured. The imaging lens is constituted by arranging a first lens L1, an aperture diaphragm S1, a second lens L2, and a third lens L3 in succession from the object side to the image side.

3 Claims, 13 Drawing Sheets

IMAGING LENS

BACKGROUND OF THE INVENTION

1. Field of the Invention

The present invention relates to an imaging lens, and more particularly to an imaging lens which is suitable for installation into an image input device of a portable telephone or personal computer, a digital camera, a CCD camera used for monitoring purposes, a surveying device, or similar which uses a CCD or CMOS as an imaging device.

2. Description of Related Art

In such an imaging lens, the optical length, which is defined as the distance from the entrance surface on the object side of the imaging lens to the imaging surface (the image-forming surface of a CCD or the like), must be short. In other words, during design of the lens, a method of reducing the ratio of the optical length to the combined focal length of the imaging lens is required. An imaging lens having a short optical length and a small optical length to focal length ratio will occasionally be referred to as a compact lens below.

Taking a portable telephone as an example, the optical length must at least be shorter than the thickness of the portable telephone body. Meanwhile, the back focus, which is defined as the distance from the exit surface on the image side of the imaging lens to the imaging surface, is preferably as long as possible. In other words, during design of the lens, a method of increasing the ratio of the back focus to the focal length as much as possible is required. This is due to the need to insert components such as a filter or cover glass between the imaging lens and the imaging surface.

As well as the points described above, a imaging lens is required to be corrected such that various aberrations are reduced by a sufficient amount that distortion of the image is not visually perceptible, and as required by the integration density of the imaging elements (also called "pixels"). Below, "various aberrations have been corrected so as to be sufficiently small that image distortions are not visually perceived, and requirements of the imaging element integration density are met" is, for simplicity, represented by the phrase "various aberrations are satisfactorily corrected" or similar. An image in which various aberrations are satisfactorily corrected may be called a "satisfactory image".

As will be described below, imaging lenses with a three-lens structure which are suitable for use in imaging devices such as portable computers, video telephones, or similar using a solid-state imaging device such as a CCD or CMOS have been disclosed. These lenses all secure a wide viewing angle, and are compact and lightweight.

Of these lenses, an imaging lens capable of obtaining images with satisfactorily corrected aberration while securing a wide viewing angle has been disclosed as a first three-layer lens (for example, Japanese Unexamined Patent Application Publication No. 2001-075006).

However, the refractive power of these three lenses, which are constituted by first, second, and third lenses arrayed in succession from the object side, is positive in the first lens, negative in the second lens, and positive in the third lens, and hence the distance (optical length) from the surface of the first lens on the object side to the imaging surface cannot be shortened. Further, a diaphragm is disposed on the object-side surface of the first lens, and hence the effective diameter of the third lens cannot be reduced. As a result, a compact lens cannot be produced.

Imaging lenses in which aberration is satisfactorily corrected and a short focus is realized while securing a wide viewing angle have been respectively disclosed as second through fourth three-layer lenses (for example, Japanese Unexamined Patent Application Publication No. 2003-149548, Japanese Unexamined Patent Application Publication No. 2002-221659, and Japanese Unexamined Patent Application Publication No. 2002-244030).

However, similarly to the imaging lens described above, the refractive power of the three lenses of these imaging lenses, constituted by first, second, and third lenses arranged in succession from the object side, is positive in the first lens, negative in the second lens, and positive in the third lens. Hence, although these imaging lenses are set with a short combined imaging lens focal length, the back focus is long, and thus the optical length is too long. In addition, these lenses use glass materials, and are therefore expensive.

An imaging lens which uses aspherical lenses and is reduced in size by appropriately setting power distribution and surface shape has been disclosed as a fifth three-layer lens (for example, Japanese Unexamined Patent Application Publication No. 2003-149545).

However, the refractive power of the three lenses of this imaging lens, constituted by first, second, and third lenses arranged in succession from the object side, is negative in the first lens, positive in the second lens, and negative in the third lens. As a result, the imaging lens has a long optical length. In addition, the lenses use glass materials, and are therefore expensive.

A lens in which a pair of meniscus lenses whose concave surfaces face each other are constituted by plastic lenses each having at least one aspherical surface, and in which the entire lens system has a three-layer structure, has been disclosed as a sixth three-layer lens (for example, Japanese Unexamined Patent Application Publication No. H10-301022). This lens achieves compactness and low cost, and is capable of suppressing focus movement due to temperature change with ease.

However, the refractive power of the three lenses in this imaging lens, which are arranged as first, second, and third lenses in succession from the object side, is weak in the first lens, weak in the second lens, and positive in the third lens, and hence the refractive power of the first lens and second lens cannot be fully compensated for by the third lens alone. As a result, the back focus lengthens, causing an increase in the optical length. Furthermore, the third lens uses a glass material, and hence cost reduction is incomplete.

A low-cost lens system with a short optical length which has a telephoto-type lens constitution in which the entire lens system is divided into front and rear groups, the front group having a positive refractive power and the rear group having a negative refractive power, has been disclosed as a seventh three-layer lens (for example, Japanese Unexamined Patent Application Publication No. H10-301021).

However, the refractive power of the three lenses in this lens system, which are arranged as first, second, and third lenses in succession from the object side, is negative in the first lens, positive in the second lens, and negative in the third lens, and the interval between the second lens and third lens is wide. As a result, the optical length is long, and the aperture of the third lens widens. This is unsuitable for installation in image input devices of portable telephones or personal computers, digital cameras, CCD cameras used for monitoring purposes, surveying devices, and so on.

An imaging lens comprising, in succession from the object side, two positive lenses, and a negative lens whose concave surface faces the image side, both surfaces of which are aspherical and the negative power of which gradually weakens from the center of the lens toward the periphery so as to have a positive power on the periphery, has been disclosed as an eighth three-layer lens (for example, Japanese Unexamined Patent Application Publication No. 2003-322792).

In this lens system, however, the back focus is short in relation to the focal length, and hence it is difficult to insert components such as a filter between the imaging lens and imaging surface. More specifically, considering the lens described in the embodiments, this lens is converted to an imaging lens with a combined focal length of 1.0 mm, and the back focus (which corresponds to D7+D8+D9 according to the reference symbols used in Japanese Unexamined Patent Application Publication No. 2001-075006) is 0.3890 mm in the first embodiment and 0.4423 mm in the second embodiment. Since components such as a filter must be inserted between the imaging lens and imaging surface in image input devices of portable telephones and the like, this lens is difficult to use in such an application.

It is therefore an object of the present invention to provide an imaging lens which is suitable for installation in a camera using a CCD or CMOS as an imaging device, which has a short optical length (a small optical length to focal length ratio), a back focus which is as long as possible (a back focus to focal length ratio which is as large as possible), and which is thus capable of obtaining satisfactory image.

Another object of the present invention is to provide guidelines for selecting lens materials having an Abbe number within an appropriate range in order to obtain satisfactory image.

A further object of the present invention is to provide an imaging lens in which all of the (three) lenses constituting the imaging lens of the invention are made of plastic materials to thereby reduce cost and weight. Here, "plastic materials" refers to high polymeric substances which are transparent to visible light, and may molded by being subjected to plastic deformation through application of heat, pressure, or both and thereby formed into lenses.

SUMMARY OF THE INVENTION

In order to achieve the objects described above, an imaging lens according to the present invention is constituted by arranging a first lens L1, an aperture diaphragm S1, a second lens L2, and a third lens L3 in succession from the object side to the image side. The first lens L1 is a resin lens having a positive refractive power and a meniscus shape in which the convex surface faces the object side. The second lens L2 is a resin lens having a positive refractive power and a meniscus shape in which the convex surface faces the image side. The third lens L3 is a resin lens having a negative refractive power.

Further, both surfaces of the first lens L1, both surfaces of the second lens L2, and at least one surface of the third lens L3 are constituted by aspherical surfaces.

According to constitutional examples of the invention, this imaging lens satisfies the following conditions (1) through (5).

$$0.40 < r_1/r_2 < 0.65 \tag{1}$$

$$0.08 < D_2/f < 0.1 \tag{2}$$

$$0.2 < D_3/f < 0.3 \tag{3}$$

$$1.0 < d/f < 1.5 \tag{4}$$

$$0.4 < b_f/f < 0.6 \tag{5}$$

where f is the focal length of the entire lens system, $r_1$ is the radius of curvature (axial curvature radius) of the object-side surface of the first lens L1 in the vicinity of the optical axis, $r_2$ is the radius of curvature (axial curvature radius) of the image-side surface of the first lens L1 in the vicinity of the optical axis, $D_2$ is the interval between the first lens L1 and second lens L2, $D_3$ is the thickness at the center of the second lens L2, d is the distance (in air) from the object-side surface of the first lens L1 to the imaging surface, and $b_f$ is the back focus (in air).

The back focus $b_f$, which is defined as the distance from the exit surface on the image side of the imaging lens to the imaging surface, is defined here as the distance from the image-side surface $r_7$ of the third lens L3 to the imaging surface $r_{10}$.

Further, the first lens L1, second lens L2, and third lens L3 are preferably constituted by lenses formed from a material having an Abbe number within a range of thirty to sixty. It is also preferable that the first lens L1, second lens L2, and third lens L3 be constituted by lenses formed using a cycloolefin plastic as a material.

The conditional expression (1) illustrated above is a condition for determining the ratio $r_1/r_2$ of the axial curvature radius $r_1$ of the first surface of the first lens L1 and the axial curvature radius $r_2$ of the second surface of the first lens L1. If the ratio $r_1/r_2$ is larger than the lower limit provided by the conditional expression (1), then the back focus of the imaging lens is sufficient for inserting a component such as a cover glass or filter between the imaging lens and the imaging surface, and thus the back focus can be set within a range which does not impair the compactness of the device into which the imaging lens is to be installed. Moreover, distortion can be reduced sufficiently, and hence manufacturing of the first surface of the first lens L1 is facilitated.

If the ratio $r_1/r_2$ is smaller than the upper limit provided by the conditional expression (1), then the absolute distortion value is sufficiently small. Furthermore, in this case, distortion can be reduced sufficiently without increasing the number of aspherical elements.

The conditional expression (2) illustrated above is for defining the allowable range of the interval $D_2$ between the first lens L1 and second lens L2 by $D_2/f$, which is normalized by the combined focal length f of the imaging lens. If $D_2/f$ is larger than the lower limit provided by the conditional expression (2), then the interval between the image-side surface $r_2$ of the first lens L1 and the object-side surface $r_4$ of the second lens L2 can be secured as a sufficient interval for inserting the aperture diaphragm S1. In other words, the outer forms of the first lens L1 and second lens L2 do not have to be reduced to the extent that manufacture becomes difficult, and a sufficient space for inserting the aperture diaphragm S1 can be ensured.

If $D_2/f$ is smaller than the upper limit provided by the conditional expression (2), then there is no need to increase the outer form of the first lens L1 and second lens L2, and hence the imaging lens can be made compact. Further, imaging surface distortion does not increase, and hence satisfactory image are obtained.

The conditional expression (3) illustrated above is for defining the allowable range of the thickness $D_3$ at the center of the second lens L2 by $D_3/f$, which is normalized by the combined focal length f of the imaging lens. If $D_3/f$ is larger than the lower limit provided by the conditional expression (3), then the thickness $D_3$ at the center of the second lens L2 does not become too thin, and hence there is no need to reduce the thickness of the peripheral portion of the second lens L2 to the extent that manufacture becomes difficult. Moreover, the aperture of the gate used for injecting molten resin into a die during injection molding of the resin lens can be sufficiently ensured, and hence the molten resin can be uniformly injected into the die with ease.

If $D_3/f$ is smaller than the upper limit provided by the conditional expression (3), then there is no need to increase the size of the lens system of the second lens L2, and thus the imaging lens can be made compact. Furthermore, imaging surface distortion does not increase, and hence satisfactory image are obtained. The imaging lens of the present invention, in which $D_3/f$ satisfies the conditional expression (3), enables molten resin to be injected into a die uniformly and hence can be manufactured easily and made compact.

The conditional expression (4) illustrated above is for defining the allowable range of the distance (in air) d from the object-side surface of the first lens L1 to the imaging surface by d/f, which is normalized by the combined focal length f of the imaging lens. The notation "distance (in air) d" used in reference to the distance d from the object-side surface of the first lens L1 to the imaging surface signifies the distance from the object-side surface of the first lens L1 to the imaging surface measured on the condition that no transparent object (a cover glass or the like) other than air be inserted between the object-side surface of the first lens L1 and the imaging surface.

If d/f is larger than the lower limit provided by the conditional expression (4), then there is no need to reduce the thickness of the first lens L1, second lens L2, and third lens L3, and hence it does not become difficult to distribute resin over the entire die during formation of the resin lenses. If d/f is smaller than the upper limit provided by the conditional expression (4), then the problem of the amount of light on the periphery of the lens being less than that in the central portion of the lens does not arise. Thus the amount of light on the periphery of the lenses can be increased without increasing the size of the outer forms of the first lens L1, second lens L2, and third lens L3, which are the constituent lenses of the imaging lens. As a result, the imaging lens can be made compact.

The conditional expression (5) illustrated above is for defining the length of the back focus $b_f$ in relation to the combined focal length f of the imaging lens. If the length of the back focus $b_f$ is within the range provided by the conditional expression (5), then a component such as a filter, which is often required in image input devices of portable telephones and the like, can be inserted between the imaging lens and the imaging surface.

By providing a lens constitution which satisfies the five conditions in the conditional expressions (1) to (5) illustrated above, the problems described above can be solved, and a compact imaging lens which is small yet capable of obtaining satisfactory image can be provided.

Further, by constituting the first lens L1, second lens L2, and third lens L3 by lenses formed from a material having an Abbe number within a range of thirty to sixty, more satisfactory image are obtained more easily than when the lenses are manufactured using a material with an Abbe number outside of this range. Further, if the first lens L1, second lens L2, and third lens L3 are formed using a cycloolefin plastic as a material, since the Abbe number of this material is 56.2, the lenses can be formed from a material having an Abbe number within a range of thirty to sixty.

According to the imaging lens of the present invention, lenses formed from a material having an Abbe number within a range of thirty to sixty can be used, and hence the material is not limited to a specific plastic material. Any plastic material with an Abbe number within a range of thirty to sixty may be used, which is extremely convenient for implementing the invention.

Further, it is well known that cycloolefin plastic materials are suitable for forming lenses according to injection molding methods that are already well-established as manufacturing techniques. Moreover, cycloolefin plastic materials have a record of usage in other lens systems to the imaging lens of the present invention, and hence if a cycloolefin plastic material is used, an imaging lens with a high degree of reliability can be manufactured.

BRIEF DESCRIPTION OF THE DRAWINGS

The foregoing and other objects, features and advantages of the present invention will be better understood from the following description taken in connection with the accompanying drawings, in which.

DESCRIPTION OF THE PREFERRED EMBODIMENTS

Figure 1:
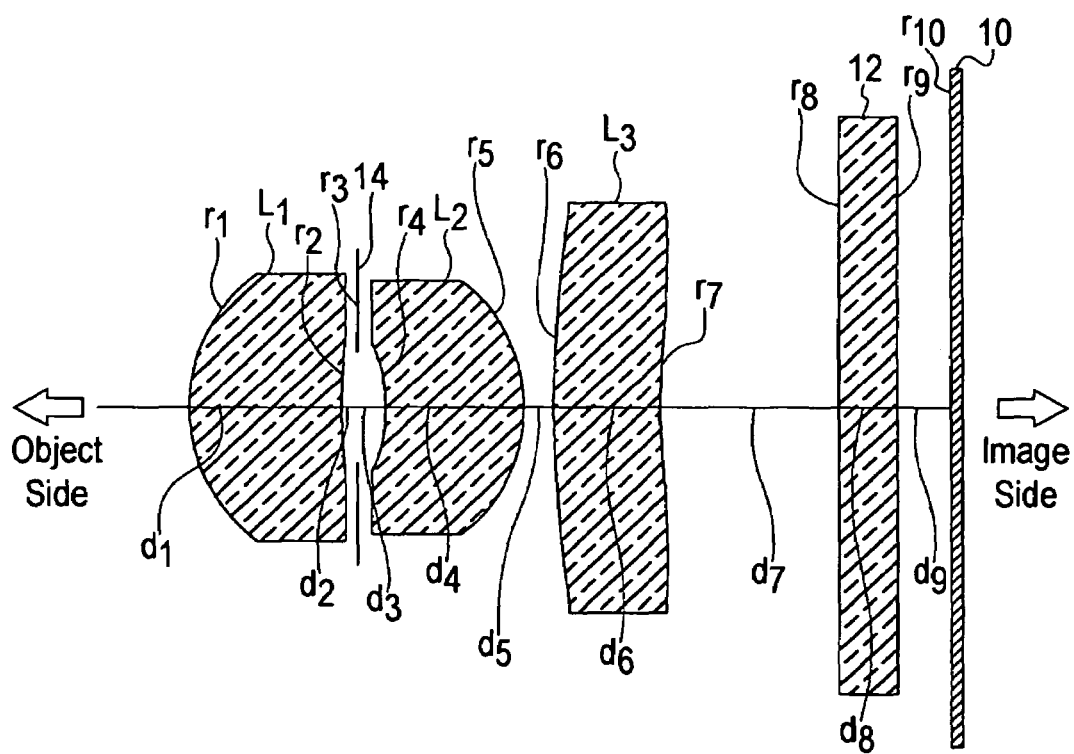
FIG. 1 is a sectional view of an imaging lens according to the present invention.

Embodiments of the present invention will be described below with reference to the drawings. Note that in the drawings, the form, magnitude, and positional relationships of each constitutional element are merely illustrated schematically in order to facilitate understanding of the invention, and the numerical conditions and other conditions to be described below are merely preferred examples thereof.

Accordingly, the present invention is in no way limited to or by the embodiments of the invention.

FIG. 1 is a constitutional diagram of an imaging lens according to the present invention (representing the first embodiment). The reference symbols defined in FIG. 1, which indicate surface numbers, surface intervals, and so on, are also used in FIGS. 2, 6, 10, and 14.

From the object side, first, second, and third lenses are indicated by the reference symbols L1, L2, and L3 respectively. An imaging device constituting the imaging surface is indicated by the numeral 10, a cover glass separating the imaging surface and lens system is indicated by the numeral 12, and an aperture diaphragm is indicated by the symbol S1. The surface of the aperture diaphragm S1 is indicated by the numeral 14. The symbols $r_1$ and $r_2$ are used without causing confusion as both variables representing axial curvature radius values and as symbols identifying lens surfaces (for example, $r_1$ is used to represent the object-side surface of the first lens and so on).

Parameters shown in the drawing such as $r_i$ (where i=1, 2, 3, ..., 10) and $d_i$ (where i=1, 2, 3, ..., 9) are provided as specific numerical values in the following Tables 1 through 4. The suffix i corresponds to the surface numbers of each lens, the lens thickness, the lens interval, or similar, in succession from the object side to the image side.

More specifically:
$r_i$ is the axial curvature radius of the $i^{th}$ surface;
$d_i$ is the distance from the $i^{th}$ surface to the $i+1^{th}$ surface;
$N_i$ is the refractive index of the lens medium constituted by the $i^{th}$ surface and the $i+1^{th}$ surface; and
$v_i$ is the Abbe number of the lens medium constituted by the $i^{th}$ surface and the $i+1^{th}$ surface.

The optical length d is a value obtained by adding together the distances from $d_1$ through $d_6$, and further adding the back focus $b_f$ thereto. The back focus $b_f$ is the distance from the image-side surface of the third lens L3 to the imaging surface on the optical axis. It is assumed that the back focus $b_f$ is measured with the cover glass 12 that is inserted between the third lens L3 and the imaging surface removed. More specifically, since the cover glass has a refractive index of more than one, the geometrical distance from the image-side surface of the third lens L3 to the imaging surface is longer when the cover glass is inserted than when the cover glass is removed. The extent to which the distance increases is determined by the refractive index and thickness of the inserted cover glass. Hence, in order to define the back focus $b_f$ as a value which is unique to the imaging lens and does not depend on the presence or absence of a cover glass, a value measured with the cover glass removed is used. The interval $D_2$ between the first lens L1 and second lens L2 is defined as $D_2=d_2+d_3$.

Aspherical surface data are illustrated together with the surface numbers in the respective columns of Tables 1 through 4. The surface $r_3$ of the aperture diaphragm S1, the two surfaces $r_8$, $r_9$ of the cover glass, and the imaging surface $r_{10}$ are flat, and hence the curvature radius thereof is displayed as ∞.

The aspherical surfaces used in the present invention are obtained according to the following equation.

$$Z=ch^2/[1+[1-(1+k)c^2h^2]^{1/2}]+A_0h^4+B_0h^6+C_0h^8+D_0h^{10}$$

where
Z is the depth from the tangent plane at the surface vertex,
c is the curvature of the surface in the vicinity of the optical axis,
h is the height from the optical axis,
k is the conic constant,
$A_0$ is the fourth-order aspheric coefficient,
$B_0$ is the sixth-order aspheric coefficient,
$C_0$ is the eighth-order aspheric coefficient, and
$D_0$ is the tenth-order aspheric coefficient.

Numerical values indicating the aspheric coefficients are displayed as indices in Tables 1 through 4 in this specification. For example, "e-1" signifies "$10^{-1}$". Further, the value illustrated as the focal length f is the combined focal length of the lens system constituted by the first through third lenses.

First through fourth embodiments will now be described with reference to FIGS. 2 through 17. FIGS. 2, 6, 10, and 14 are schematic diagrams showing lens constitutions. FIGS. 3, 7, 11, and 15 show distortion curves, FIGS. 4, 8, 12, and 16 show astigmatism curves, and FIGS. 5, 9, 13, and 17 show chromatic/spherical aberration curves.

Distortion aberration curves show the amount of aberration (the amount by which the tangent condition along the horizontal axis is not satisfied, indicated as a percentage) with respect to the distance from the optical axis (indicated as a percentage, where 100 is the maximum distance from the optical axis in the image plane along the vertical axis). Astigmatic aberration curves, similarly to distortion aberration curves, indicate the amount of aberration along the horizontal axis (millimeter units) with respect to the distance from the optical axis. In the case of astigmatic aberration, aberration amounts in the meridional plane and in the sagittal image plane (millimeter units) on the horizontal axis are shown. Chromatic/spherical aberration curves show aberration amounts along the horizontal axis (millimeter units) with respect to the distance of incidence h (F number).

Chromatic/spherical aberration curves show aberration amounts for the C line (light with wavelength 656.3 nm), d line (light with wavelength 587.6 nm), e line (light with wavelength 546.1 nm), F line (light with wavelength 486.1 nm), and g line (light with wavelength 435.8 nm). The refractive index is shown in the refractive index for the d line (light with wavelength 587.6 nm).

The curvature radius (mm units), lens surface interval (mm units), refractive index of the lens material, Abbe number of the lens material, focal length, numerical aperture, and aspheric coefficient of the lenses constituting the first through fourth embodiments are listed below.

TABLE 1

First Embodiment

| Radius of Curvature ($r_i$) | Distance ($d_i$) | Refractivity ($N_i$) | Abbe Number ($v_i$) |
|---|---|---|---|
| r1 = 0.391 | | | |
| | d1 = 0.2953 | N1 = 1.525 | v1 = 56.2 |
| r2 = 0.806 | | | |
| | d2 = 0.0196 | | |
| r3 = ∞ | | | |
| | d3 = 0.0703 | | |
| r4 = −0.273 | | | |
| | d4 = 0.2745 | N4 = 1.525 | v4 = 56.2 |
| r5 = −0.254 | | | |
| | d5 = 0.0416 | | |
| r6 = 2.488 | | | |
| | d6 = 0.2080 | N6 = 1.525 | v6 = 56.2 |
| r7 = 1.060 | | | |
| | d7 = 0.3446 | | |
| r8 = ∞ | | | |
| | d8 = 0.1112 | N8 = 1.500 | |

TABLE 1-continued

First Embodiment

| | | | |
|---|---|---|---|
| $r9 = \infty$ | | $d9 = 0.1000$ | |
| $r10 = \infty$ | | | |

Aspheric Coefficient

| K | A0 | B0 | C0 | D0 |
|---|---|---|---|---|
| 4.676e−1 | −4.745e−1 | 2.628e+1 | −2.718e+2 | 9.570e+2 |
| 7.270 | −2.127e−1 | 3.760e+1 | −9.193e+3 | −1.274e+3 |
| 8.467e−1 | 3.530 | −9.700e+2 | 7.300e+4 | −2.890e+6 |
| −2.580e−1 | 6.130 | 4.880e−1 | −7.830 | 1.623e+3 |
| −4.290e+1 | −2.270 | 1.540e+1 | −4.950e+1 | 8.845e+1 |

Focal Length f = 1.0 mm
Numerical Aperture Fno = 3.4

TABLE 2

Second Embodiment

| Radius of Curvature ($r_i$) | Distance ($d_i$) | Refractivity ($N_i$) | Abbe Number ($v_i$) |
|---|---|---|---|
| r1 = 0351 | | | |
| | d1 = 02977 | N1 = 1525 | v1 = 562 |
| r2 = 0608 | | | |
| | d2 = 00263 | | |
| r3 = ∞ | | | |
| | d3 = 00643 | | |
| r4 = −0300 | | | |
| | d4 = 02768 | N4 = 1525 | v4 = 562 |
| r5 = −0267 | | | |
| | d5 = 00266 | | |
| r6 = 2751 | | | |
| | d6 = 02097 | N6 = 1525 | v6 = 562 |
| r7 = 1.122 | | | |
| | d7 = 02814 | | |
| r8 = ∞ | | | |
| | d8 = 0.1328 | N8 = 1500 | |
| r9 = ∞ | | | |
| | d9 = 0.1000 | | |
| r10 = ∞ | | | |

Aspheric Coefficient

| K | A0 | B0 | C0 | D0 |
|---|---|---|---|---|
| 4.090e−1 | −5.850e−1 | 1.123e+1 | −6.070e+1 | 8.652e+2 |
| 9.710 | 2.650 | −1.529e+2 | −3.760e+2 | 5.620e+5 |
| 3.940e−1 | 5.911 | −8.411e+2 | 8.200e+4 | −2.550e+6 |
| −2.256e−1 | 9.190 | 2.860 | 1.464e+2 | 3.230e+3 |
| 2.540e+1 | 9.430e−2 | 2.392 | 1.420e+1 | −5.040e+1 |
| −7.900e+1 | −4.337 | 1.820e+1 | −4.130e+1 | 1.392e+2 |

Focal Length f = 1.0 mm
Numerical Aperture Fno = 3.4

TABLE 3

Third Embodiment

| Radius of Curvature ($r_i$) | Distance ($d_i$) | Refractivity ($N_i$) | Abbe Number ($v_i$) |
|---|---|---|---|
| r1 = 0.353 | | | |
| | d1 = 0.2990 | N1 = 1.525 | v1 = 56.2 |
| r2 = 0.611 | | | |
| | d2 = 0.0263 | | |
| r3 = ∞ | | | |
| | d3 = 0.0646 | | |
| r4 = −0.302 | | | |
| | d4 = 0.2780 | N4 = 1.525 | v4 = 56.2 |
| r5 = −0.268 | | | |
| | d5 = 0.0421 | | |
| r6 = 2.763 | | | |
| | d6 = 0.2106 | N6 = 1.525 | v6 = 56.2 |
| r7 = 1.127 | | | |
| | d7 = 0.2703 | | |
| r8 = ∞ | | | |
| | d8 = 0.1250 | N8 = 1.500 | |
| r9 = ∞ | | | |
| | d9 = 0.1000 | | |
| r10 = ∞ | | | |

Aspheric Coefficient

| K | A0 | B0 | C0 | D0 |
|---|---|---|---|---|
| 4.340e−1 | −4.870e−1 | 9.420 | −5.660e+1 | 1.020e+3 |
| 9.980 | 2.560 | −4.190e+1 | 3.799e+3 | 2.342e+5 |
| 3.980e−1 | 5.362 | −7.210e+2 | 8.290e+4 | −2.470e+6 |
| −2.502e−1 | 7.990 | 1.319e+1 | 6.734e+1 | 2.543e+3 |
| 2.664e+1 | −4.317e−3 | 2.109 | 1.190e+1 | −4.100e+1 |
| −6.310e+1 | −4.170 | 1.755e+1 | −4.460e+1 | 1.401e+2 |

Focal Length f = 1.0 mm
Numerical Aperture Fno = 3.4

TABLE 4

Fourth Embodiment

| Radius of Curvature ($r_i$) | Distance ($d_i$) | Refractivity ($N_i$) | Abbe Number ($v_i$) |
|---|---|---|---|
| r1 = 0.348 | | | |
| | d1 = 0.3062 | N1 = 1.525 | v1 = 56.2 |
| r2 = 0.578 | | | |
| | d2 = 0.0346 | | |
| r3 = ∞ | | | |
| | d3 = 0.0603 | | |
| r4 = −0.330 | | | |
| | d4 = 0.2784 | N4 = 1.525 | v4 = 56.2 |
| r5 = −0.275 | | | |
| | d5 = 0.0139 | | |
| r6 = 2.884 | | | |
| | d6 = 0.2171 | N6 = 1.525 | v6 = 56.2 |
| r7 = 1.063 | | | |
| | d7 = 0.2510 | | |
| r8 = ∞ | | | |
| | d8 = 0.1392 | N8 = 1.500 | |
| r9 = ∞ | | | |
| | d9 = 0.1000 | | |
| r10 = ∞ | | | |

Aspheric Coefficient

| K | A0 | B0 | C0 | D0 |
|---|---|---|---|---|
| 3.613e−1 | −5.624e−1 | 4.831 | 5.968 | 1.229e+2 |
| 8.597 | 9.734e−1 | 1.265e+1 | 2.723e+3 | −6.973e+4 |
| 6.578e−1 | 3.746 | −7.606e+2 | 6.339e+4 | −1.482e+6 |
| −2.619e−1 | 7.677 | −1.595 | 1.046e+2 | 2.072e+3 |
| 2.760e+1 | −8.532e−2 | 1.128 | 9.013 | −2.156e+1 |
| −6.957e+1 | −3.844 | 1.262e+1 | −3.305e+1 | 1.039e+2 |

Focal Length f = 1.0 mm
Numerical Aperture Fno = 3.4

The features of each of the embodiments are described below. In all of the first through fourth embodiments, ZEONEX 480R ("ZEONEX" is a registered trademark and 480R is a product number of Nippon Zeon Co., Ltd.; this will be referred to simply as "ZEONEX" below), which is a cycloolefin plastic, is used as the material for the first lens L1, second lens L2, and third lens L3.

Both surfaces of the first lens L1, and both surfaces of the second lens L2 and third lens L3 respectively, are aspherical surfaces. Hence in each of the embodiments and comparative examples, the number of aspherical surfaces is six, and thus the condition that at least one surface of the third lens L3 be an aspherical surface is satisfied.

The Abbe number of the ZEONEX 480R which is the material of the first lens L1, the second lens L2 and third lens L3 is 56.2 (the refractive index on the d line is 1.525). It was learned through simulation that if the Abbe number of the material of the lenses is within a range of thirty to sixty, substantially no discrepancies appear in lens performance qualities such as aberration. In other words, it was learned that as long as the Abbe number is a value within this range, the object of the present invention, i.e. the satisfactory correction of various aberrations in an imaging lens in comparison to aberration correction in a conventional imaging lens, can be realized.

A filter 12 is inserted between the lens system and the imaging surface in each of the first through fourth embodiments. Glass (with a refractive index on the d line of 1.52) is used as the material for this filter. The various aberrations to be described below are calculated on the premise that the filter is present. The focal length of the entire imaging lens system disclosed in the following first through fourth embodiments, or in other words the combined focal length f, is set to 1.0 mm.

First Embodiment (A) The object-side curvature radius $r_1$ of the first lens L1 is $r_1$=0.391 mm.
(B) The image-side curvature radius $r_2$ of the first lens L1 is $r_2$=0.806 mm.
(C) The back focus $b_f$ is $b_f$=0.519 mm.
(D) The distance in air from the object-side surface of the first lens L1 to the imaging surface, or in other words the optical length d, is d=1.4283 mm.
(E) The interval $D_2$ between the first lens L1 and second lens L2 is $D_2$=$d_2$+$d_3$=0.0899 mm.
(F) The thickness $D_3$ at the center of the second lens L2 is $D_3$=$d_4$=0.2745 mm.
(G) The focal length $f_1$ of the first lens L1 is $f_1$=1.16 mm.
(H) The focal length $f_2$ of the second lens L2 is $f_2$=1.16 mm.
(I) The focal length $f_3$ of the third lens L3 is $f_3$=−3.7 mm.
Hence
(1) $r_1/r_2$=0.391/0.806=0.4851
(2) $D_2/f$=0.0899/1.00=0.0899
(3) $D_3/f$=0.2745/1.00=0.2745
(4) d/f=1.4283/1.00=1.4283, and
(5) $b_f/f$=0.519/1.00=0.519.

Thus the lens system of the first embodiment satisfies all of the following conditional expressions (1) through (5).

$$0.40 < r_1/r_2 < 0.65 \quad (1)$$

$$0.08 < D_2/f < 0.1 \quad (2)$$

$$0.2 < D_3/f < 0.3 \quad (3)$$

$$1.0 < d/f < 1.5 \quad (4)$$

$$0.4 < b_f/f < 0.6 \quad (5)$$

Hereafter, the term "conditional expressions" will be used to indicate these five expressions (1) through (5).

As shown in Table 1, the aperture diaphragm S1 is provided in a position 0.0196 mm ($d_2$=0.0196 mm) rearward of the second surface (the image-side surface) of the first lens L1. The numerical aperture (F number) is 3.4.

Figure 2:
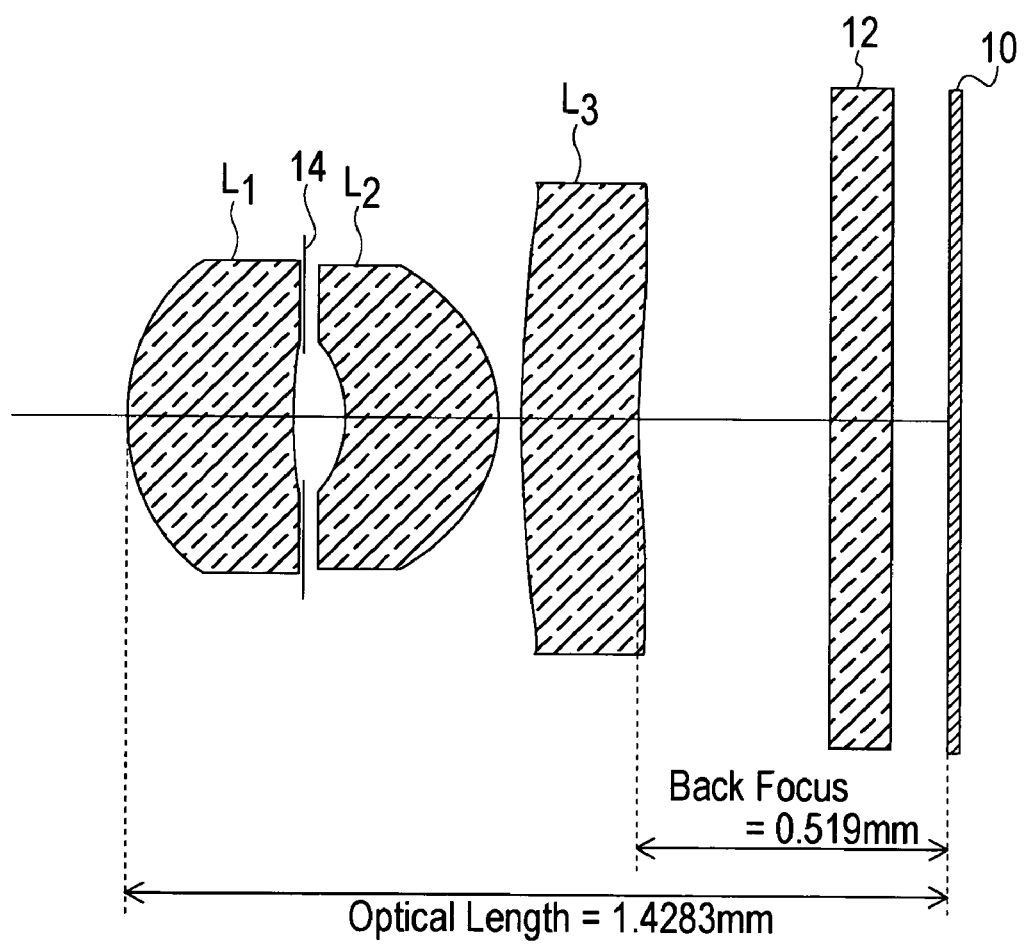
FIG. 2 is a sectional view of an imaging lens of a first embodiment.

A sectional view of the imaging lens of the first embodiment is shown in FIG. 2. The back focus in relation to a focal length of 1.00 mm is 0.519 mm, and hence a sufficient length is secured.

Figure 3:
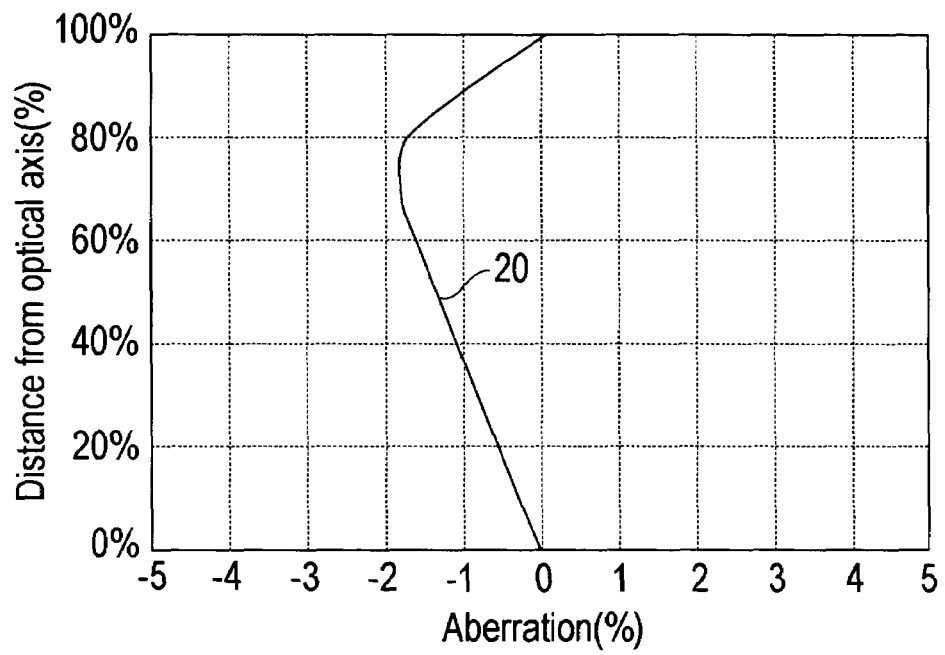
FIG. 3 is a view of distortion in the imaging lens of the first embodiment.
Figure 4:
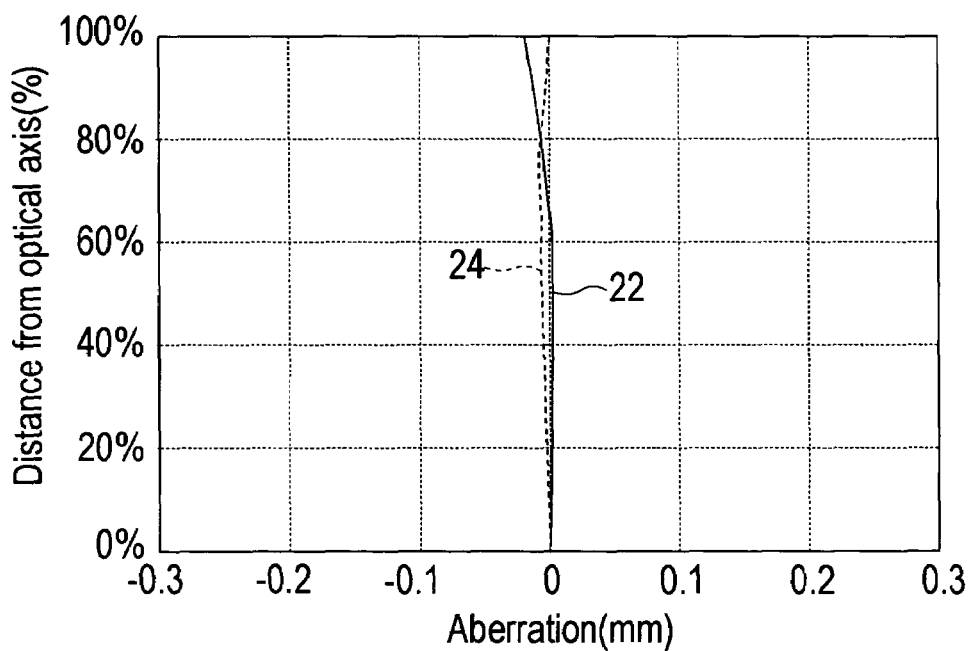
FIG. 4 is a view of astigmatism in the imaging lens of the first embodiment.
Figure 5:
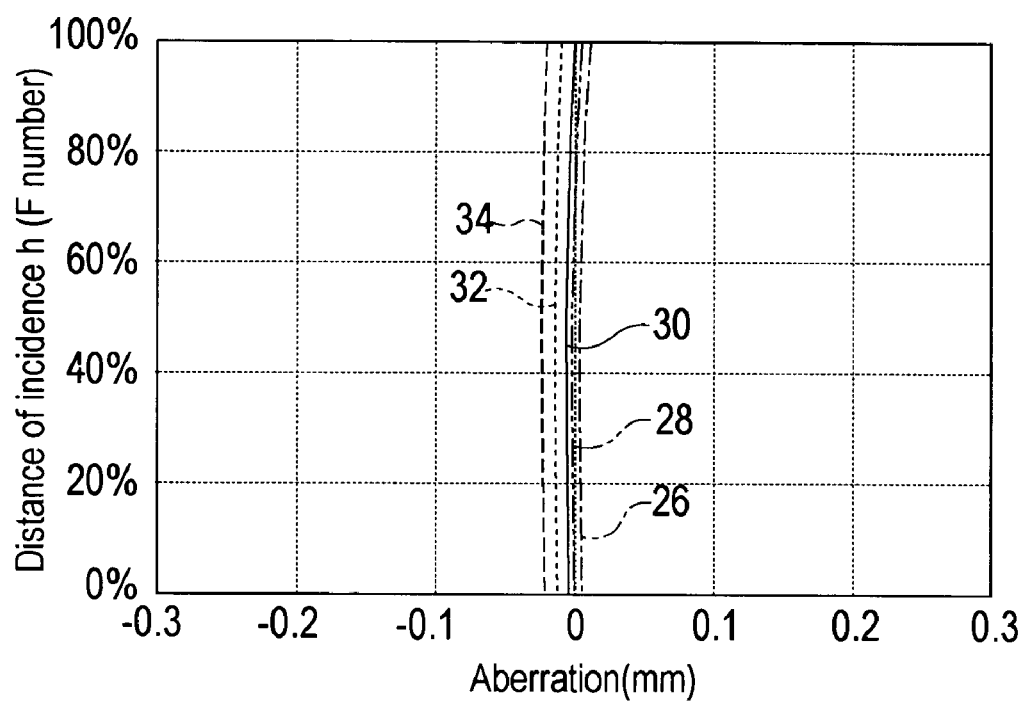
FIG. 5 is a view of chromatic/spherical aberration in the imaging lens of the first embodiment.

The distortion curve 20 shown in FIG. 3, the astigmatism curve (the aberration curve 22 relating to the meridional plane and the aberration curve 24 relating to the sagittal plane) shown in FIG. 4, and the chromatic/spherical aberration curve (the aberration curve 26 relating to the C line, the aberration curve 28 relating to the d line, the aberration curve 30 relating to the e line, the aberration curve 32 relating to the F line, and the aberration curve 34 relating to the g line) shown in FIG. 5 are respectively illustrated by graphs.

The ordinate of the aberration curves in FIGS. 3 and 4 illustrate the image height as a percentage of the distance from the optical axis. In FIGS. 3 and 4, 100%, 80%, 70%, and 60% correspond to 0.600 mm, 0.480 mm, 0.420 mm, and 0.360 mm respectively. The ordinate of the aberration curve in FIG. 5 indicates the incidence height h (F number), corresponding at its maximum to F3.4. The abscissa in FIG. 5 shows the magnitude of the aberration.

As regards distortion, the absolute value of the amount of aberration reaches a maximum of 1.80% in an image height position of 70% (image height 0.420 mm), and hence within a range of image height 0.600 mm and below, the absolute value of the aberration amount is held within 1.80%.

As for astigmatism, the absolute value of the aberration amount on the meridional plane reaches a maximum of 0.0184 mm in an image height position of 100% (image height 0.600 mm), and hence within a range of image height 0.600 mm and below, the absolute value of the aberration amount is held within 0.0184 mm.

As for chromatic/spherical aberration, the absolute value of the aberration curve 34 relating to the g line reaches a maximum of 0.024 mm at an incidence height h of 50%, and hence the absolute value of the aberration amount is held within 0.024 mm.

Second Embodiment (A) The object-side curvature radius $r_1$ of the first lens L1 is $r_1$=0.351 mm.
(B) The image-side curvature radius $r_2$ of the first lens L1 is $r_2$=0.608 mm.
(C) The back focus $b_f$ is $b_f$=0.470 mm.
(D) The distance in air from the object-side surface of the first lens L1 to the imaging surface, or in other words the optical length d, is d=1.3714 mm.
(E) The interval $D_2$ between the first lens L1 and second lens L2 is $D_2$=$d_2$+$d_3$=0.0906 mm.
(F) The thickness $D_3$ at the center of the second lens L2 is $D_3$=$d_4$=0.2768 mm.
(G) The focal length $f_1$ of the first lens L1 is $f_1$=1.13 mm.
(H) The focal length $f_2$ of the second lens L2 is $f_2$=1.19 mm.
(I) The focal length $f_3$ of the third lens L3 is $f_3$=−3.77 mm.
Hence
(1) $r_1/r_2$=0.351/0.608=0.5773
(2) $D_2/f$=0.0906/1.00=0.0906
(3) $D_3/f$=0.2768/1.00=0.2768
(4) d/f=1.3714/1.00=1.3714, and
(5) $b_f/f$=0.470/1.00=0.47.

Thus the lens system of the second embodiment satisfies the conditional expressions.

As shown in Table 2, the aperture diaphragm S1 is provided in a position 0.0263 mm ($d_2$=0.0263 mm) rearward of the second surface (the image-side surface) of the first lens L1. The numerical aperture (F number) is 3.4.

Figure 6:
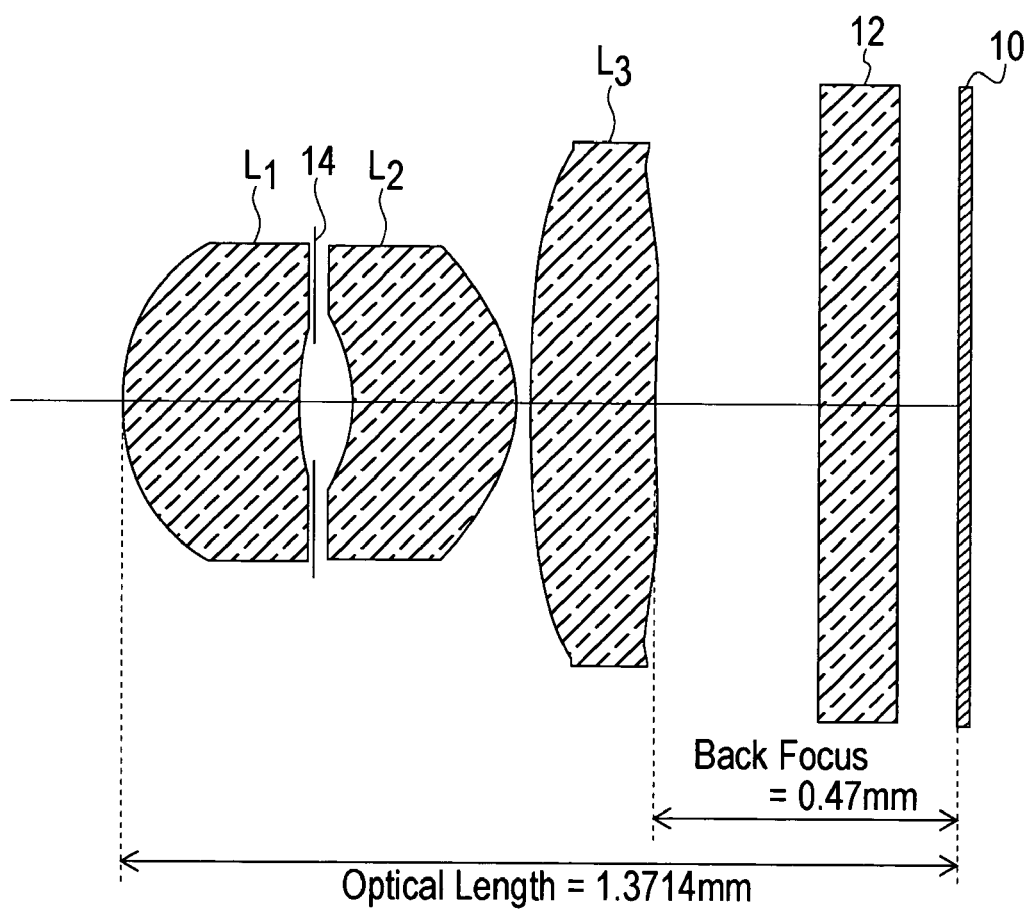
FIG. 6 is a sectional view of an imaging lens of a second embodiment.

A sectional view of the imaging lens of the second embodiment is shown in FIG. 6. The back focus in relation to a focal length of 1.00 mm is 0.470 mm, and hence a sufficient length is secured.

Figure 7:
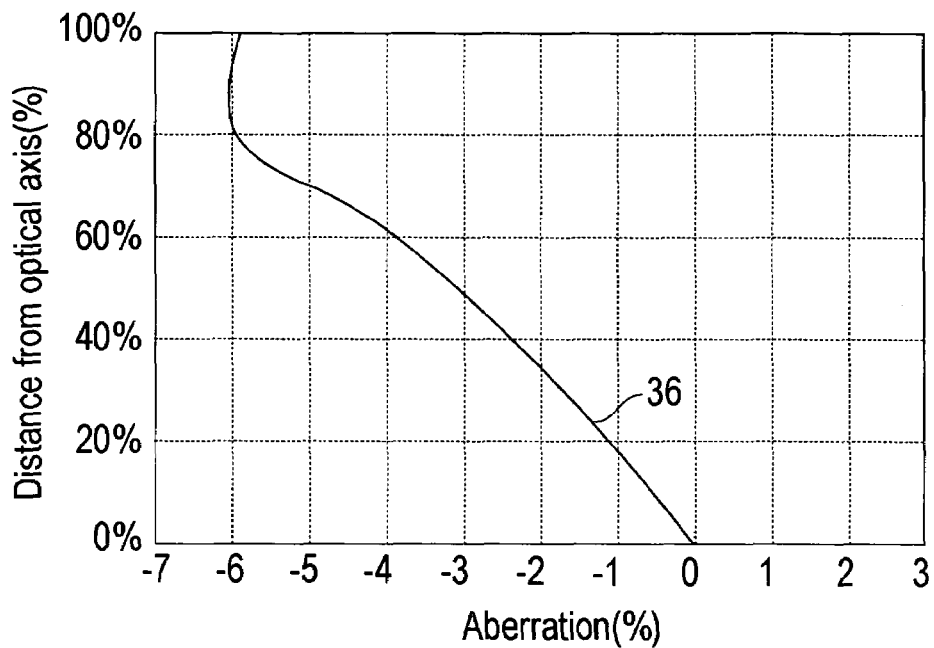
FIG. 7 is a view of distortion in the imaging lens of the second embodiment.
Figure 8:
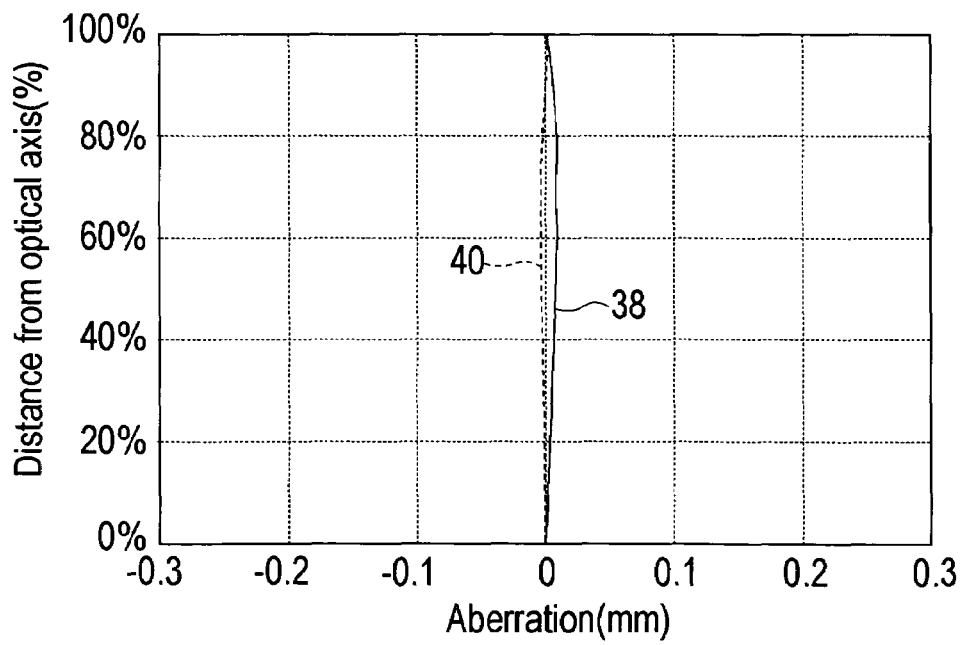
FIG. 8 is a view of astigmatism in the imaging lens of the second embodiment.
Figure 9:
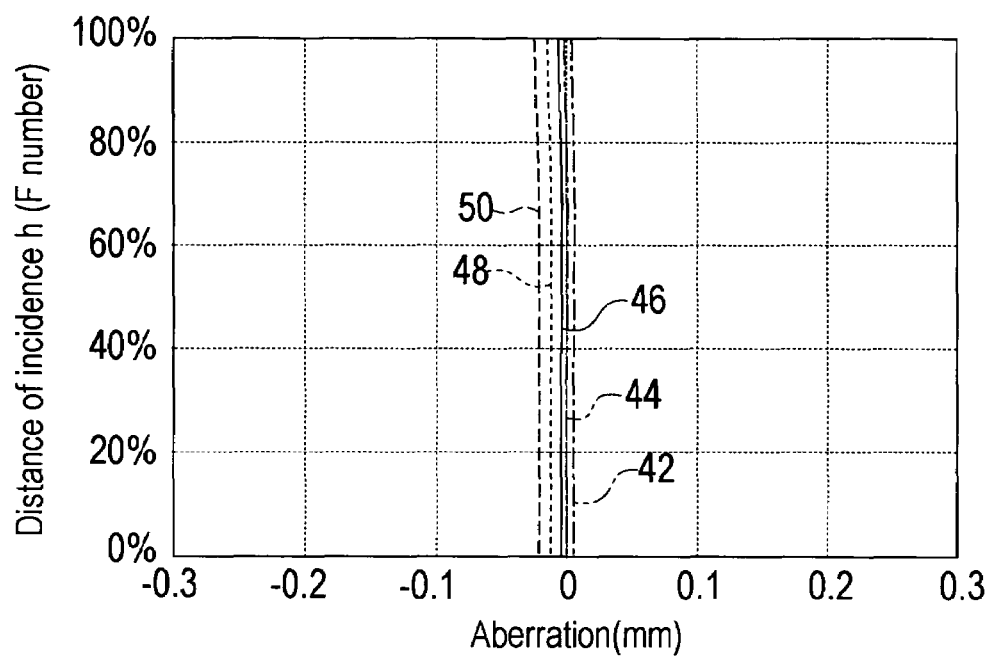
FIG. 9 is a view of chromatic/spherical aberration in the imaging lens of the second embodiment.

The distortion curve 36 shown in FIG. 7, the astigmatism curve (the aberration curve 38 relating to the meridional plane and the aberration curve 40 relating to the sagittal plane) shown in FIG. 8, and the chromatic/spherical aberration curve (the aberration curve 42 relating to the C line, the aberration curve 44 relating to the d line, the aberration curve 46 relating to the e line, the aberration curve 48 relating to the F line, and the aberration curve 50 relating to the g line) shown in FIG. 9 are respectively illustrated by graphs.

The ordinate of the aberration curves in FIGS. 7 and 8 illustrate the image height as a percentage of the distance from the optical axis. In FIGS. 7 and 8, 100%, 80%, 70%, and 60% correspond to 0.550 mm, 0.440 mm, 0.385 mm, and 0.330 mm respectively. The ordinate of the aberration curve in FIG. 9 indicates the incidence height h (F number), corresponding at its maximum to F3.4. The abscissa in FIG. 9 shows the magnitude of the aberration.

As regards distortion, the absolute value of the amount of aberration reaches a maximum of 5.94% in an image height position of 80% (image height 0.440 mm), and hence within a range of image height 0.550 mm and below, the absolute value of the aberration amount is held within 5.94%.

As for astigmatism, the absolute value of the aberration amount on the meridional plane reaches a maximum of 0.0095 mm in an image height position of 60% (image height 0.330 mm), and hence within a range of image height 0.550 mm and below, the absolute value of the aberration amount is held within 0.0095 mm.

As for chromatic/spherical aberration, the absolute value of the aberration curve 50 relating to the g line reaches a maximum of 0.0246 mm at an incidence height h of 100%, and hence the absolute value of the aberration amount is held within 0.0246 mm.

Third Embodiment (A) The object-side curvature radius $r_1$ of the first lens L1 is $r_1$=0.353 mm.
(B) The image-side curvature radius $r_2$ of the first lens L1 is $r_2$=0.611 mm.
(C) The back focus $b_f$ is $b_f$=0.454 mm.
(D) The distance in air from the object-side surface of the first lens L1 to the imaging surface, or in other words the optical length d, is d=1.3746 mm.
(E) The interval $D_2$ between the first lens L1 and second lens L2 is $D_2$=$d_2$+$d_3$=0.0909 mm.
(F) The thickness $D_3$ at the center of the second lens L2 is $D_3$=$d_4$=0.278 mm.
(G) The focal length $f_1$ of the first lens L1 is $f_1$=1.14 mm.
(H) The focal length $f_2$ of the second lens L2 is $f_2$=1.19 mm.
(I) The focal length $f_3$ of the third lens L3 is $f_3$=−3.79 mm.
Hence
(1) $r_1/r_2$=0.353/0.611=0.5778
(2) $D_2/f$=0.0909/1.00=0.0909
(3) $D_3/f$=0.278/1.00=0.278
(4) d/f=1.3746/1.00=1.3746, and
(5) $b_f/f$=0.454/1.00=0.454.

Thus the lens system of the third embodiment satisfies the conditional expressions.

As shown in Table 3, the aperture diaphragm S1 is provided in a position 0.0263 mm ($d_2$=0.0263 mm) rearward of the second surface (the image-side surface) of the first lens L1. The numerical aperture (F number) is 3.4.

Figure 10:
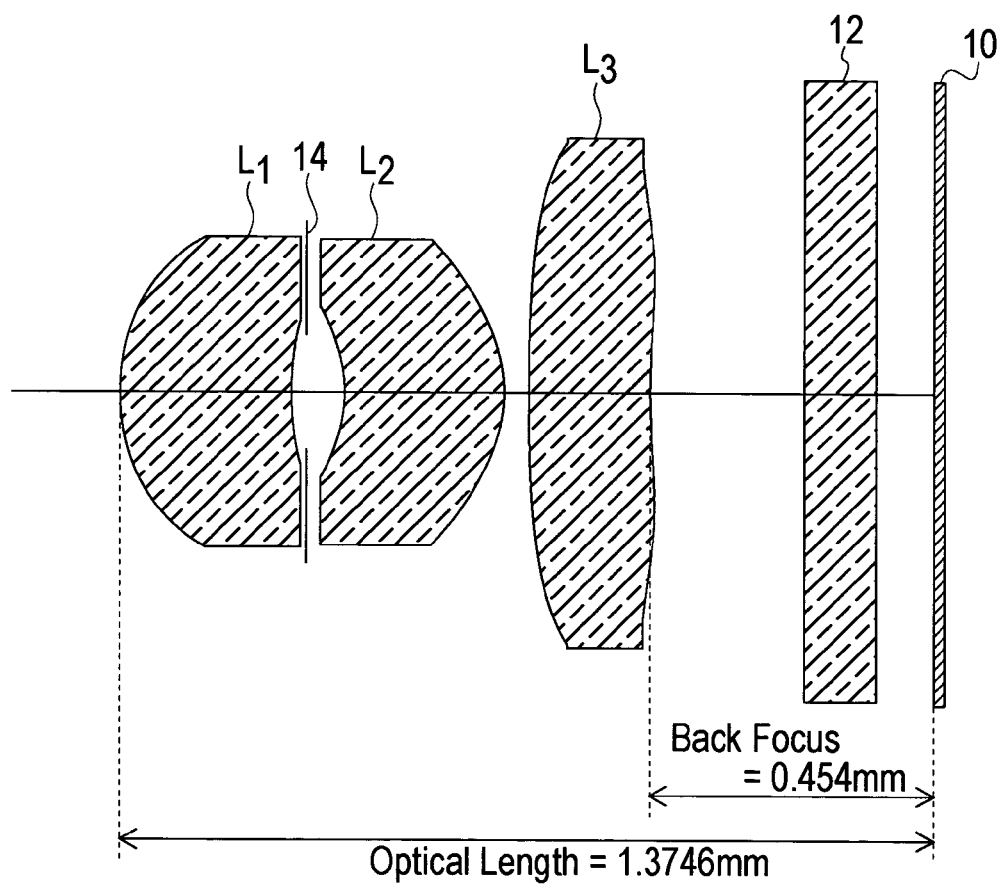
FIG. 10 is a sectional view of an imaging lens of a third embodiment.

A sectional view of the imaging lens of the third embodiment is shown in FIG. 10. The back focus in relation to a focal length of 1.00 mm is 0.454 mm, and hence a sufficient length is secured.

Figure 11:
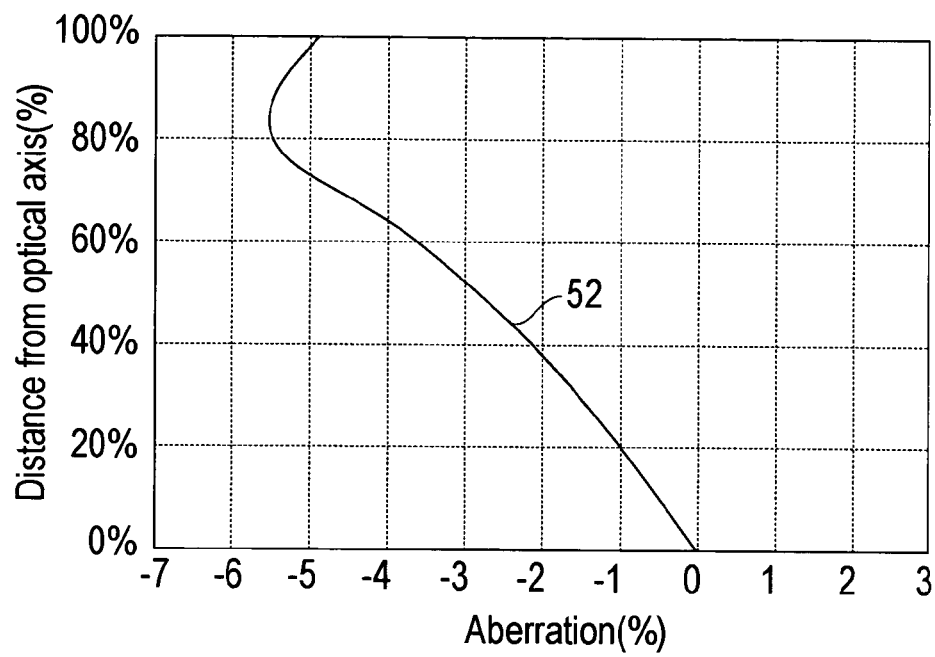
FIG. 11 is a view of distortion in the imaging lens of the third embodiment.
Figure 12:
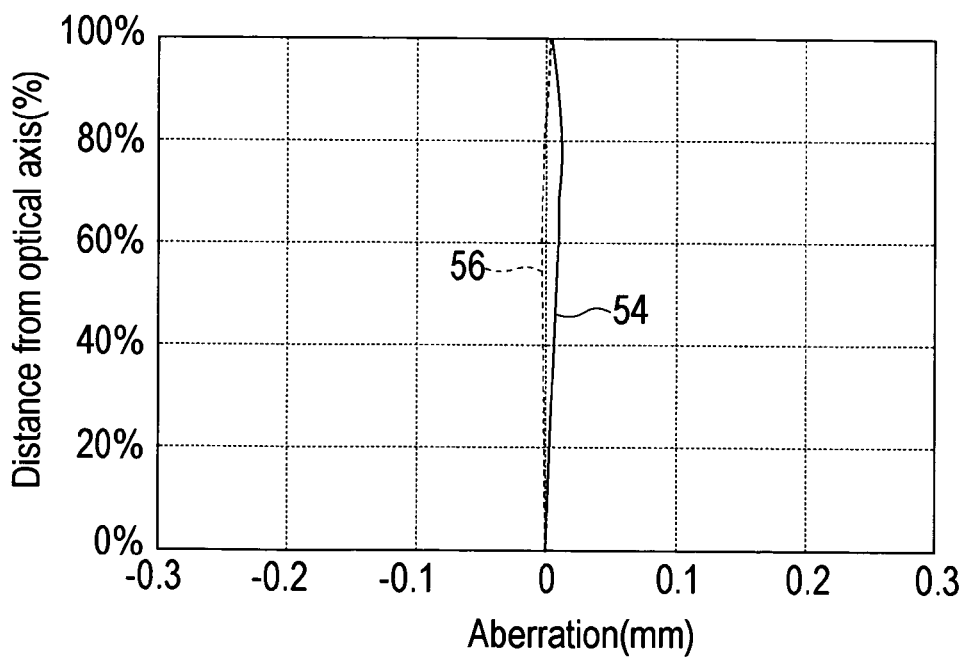
FIG. 12 is a view of astigmatism in the imaging lens of the third embodiment.
Figure 13:
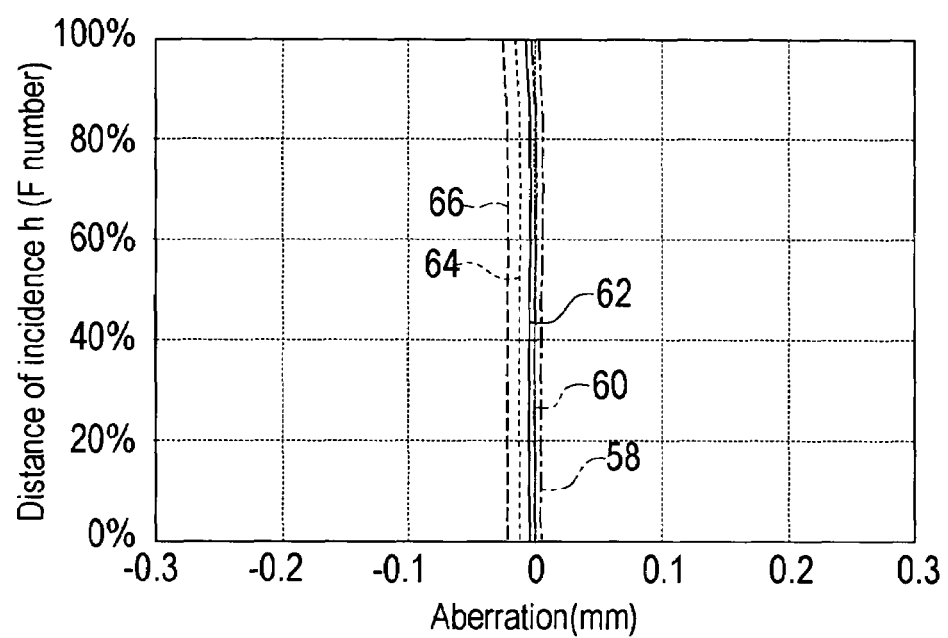
FIG. 13 is a view of chromatic/spherical aberration in the imaging lens of the third embodiment.

The distortion curve 52 shown in FIG. 11, the astigmatism curve (the aberration curve 54 relating to the meridional plane and the aberration curve 56 relating to the sagittal plane) shown in FIG. 12, and the chromatic/spherical aberration curve (the aberration curve 58 relating to the C line, the aberration curve 60 relating to the d line, the aberration curve 62 relating to the e line, the aberration curve 64 relating to the F line, and the aberration curve 66 relating to the g line) shown in FIG. 13 are respectively illustrated by graphs.

The ordinate of the aberration curves in FIGS. 11 and 12 illustrate the image height as a percentage of the distance from the optical axis. In FIGS. 11 and 12, 100%, 80%, 70%, and 60% correspond to 0.550 mm, 0.440 mm, 0.385 mm, and 0.330 mm respectively. The ordinate in the aberration curve of FIG. 13 indicates the incidence height h (F number), corresponding at its maximum to F3.4. The abscissa in FIG. 13 shows the magnitude of the aberration.

As regards distortion, the absolute value of the amount of aberration reaches a maximum of 5.4728% in an image height position of 80% (image height 0.440 mm), and hence within a range of image height 0.550 mm and below, the absolute value of the aberration amount is held within 5.4728%.

As for astigmatism, the absolute value of the aberration amount on the meridional plane reaches a maximum of 0.0118 mm in an image height position of 80% (image height 0.440 mm), and hence within a range of image height 0.550 mm and below, the absolute value of the aberration amount is held within 0.0118 mm.

As for chromatic/spherical aberration, the absolute value of the aberration curve 66 relating to the g line reaches a maximum of 0.0251 mm at an incidence height h of 100%, and hence the absolute value of the aberration amount is held within 0.0251 mm.

Fourth Embodiment (A) The object-side curvature radius $r_1$ of the first lens L1 is $r_1$=0.348 mm.
(B) The image-side curvature radius $r_2$ of the first lens L1 is $r_2$=0.578 mm.
(C) The back focus $b_f$ is $b_f$=0.444 mm.
(D) The distance in air from the object-side surface of the first lens L1 to the imaging surface, or in other words the optical length d, is d=1.3545 mm.
(E) The interval $D_2$ between the first lens L1 and second lens L2 is $D_2$=$d_2$+$d_3$=0.0949 mm.
(F) The thickness $D_3$ at the center of the second lens L2 is $D_3$=$d_4$=0.2784 mm.

(G) The focal length $f_1$ of the first lens L1 is $f_1$=1.14 mm.
(H) The focal length $f_2$ of the second lens L2 is $f_2$=1.14 mm.
(I) The focal length $f_3$ of the third lens L3 is $f_3$=−3.34 mm.
Hence
(1) $r_1/r_2$=0.348/0.578=0.6021
(2) $D_2/f$=0.0949/1.00=0.0949
(3) $D_3/f$=0.2784/1.00=0.2784 (4) $d/f$=1.3545/1.00=1.3545, and
(5) $b_f/f$=0.444/1.00=0.444.

Thus the lens system of the fourth embodiment satisfies the conditional expressions.

As shown in Table 4, the aperture diaphragm S1 is provided in a position 0.0346 mm ($d_2$=0.0346 mm) rearward of the second surface (the image-side surface) of the first lens L1. The numerical aperture (F number) is 3.4.

Figure 14:
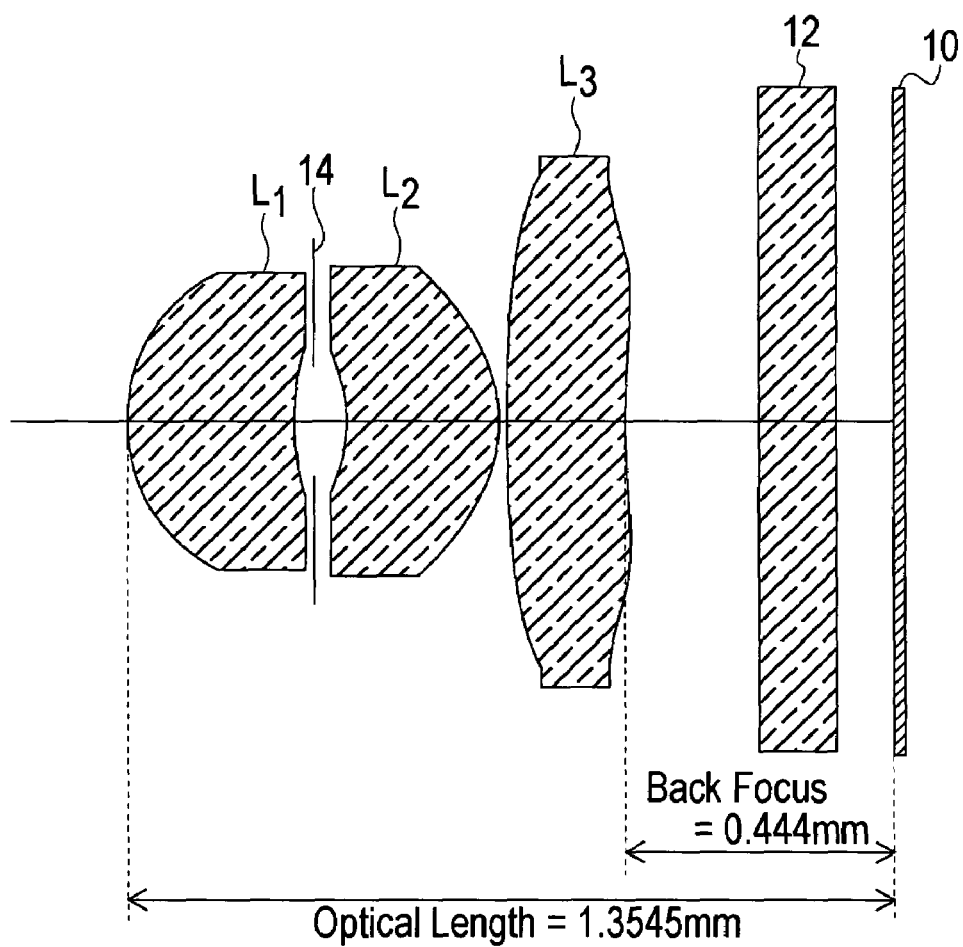
FIG. 14 is a sectional view of an imaging lens of a fourth embodiment.

A sectional view of the imaging lens of the fourth embodiment is shown in FIG. 14. The back focus in relation to a focal length of 1.00 mm is 0.444 mm, and hence a sufficient length is secured.

Figure 15:
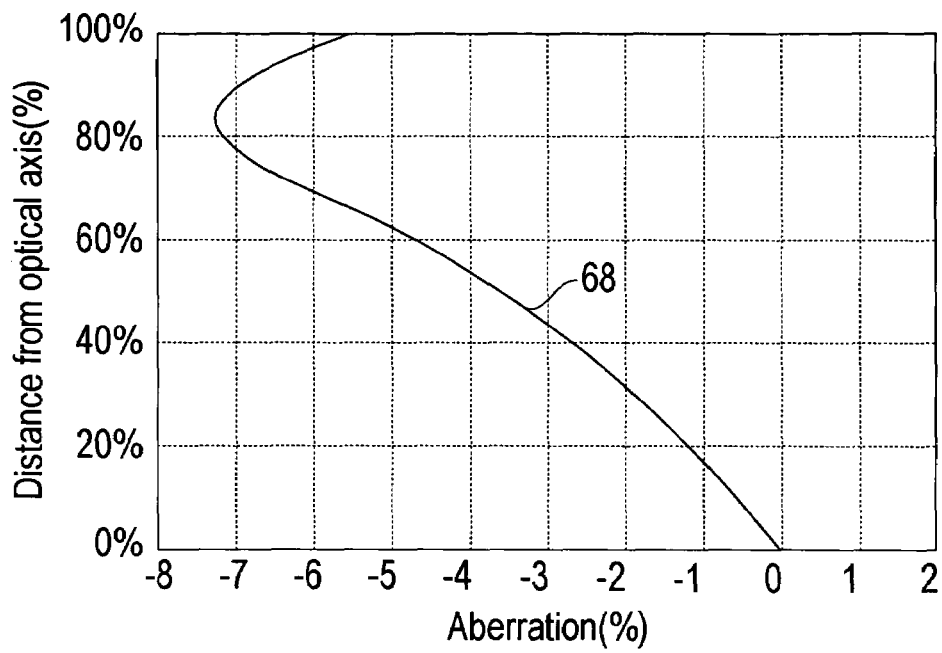
FIG. 15 is a view of distortion in the imaging lens of the fourth embodiment.
Figure 16:
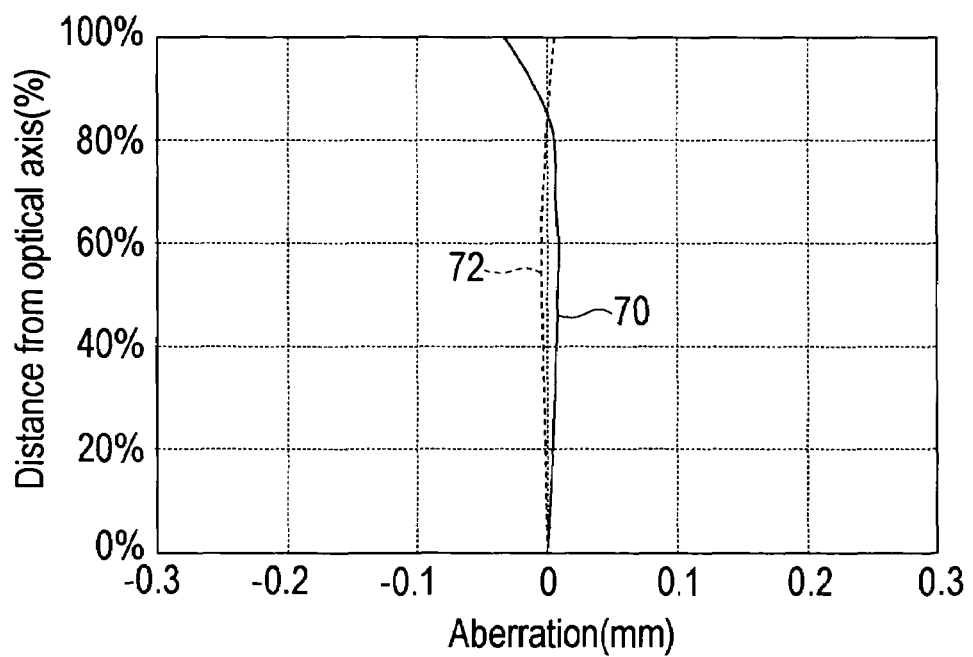
FIG. 16 is a view of astigmatism in the imaging lens of the fourth embodiment.
Figure 17:
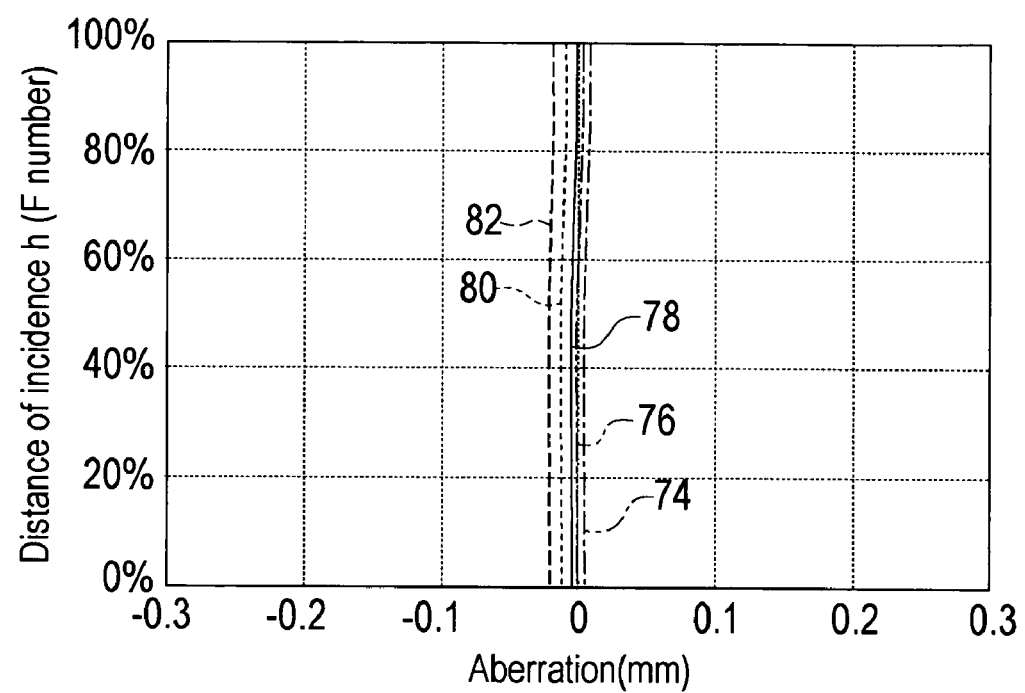
FIG. 17 is a view of chromatic/spherical aberration in the imaging lens of the fourth embodiment.

The distortion curve 68 shown in FIG. 15, the astigmatism curve (the aberration curve 70 relating to the meridional plane and the aberration curve 72 relating to the sagittal plane) shown in FIG. 16, and the chromatic/spherical aberration curve (the aberration curve 74 relating to the C line, the aberration curve 76 relating to the d line, the aberration curve 78 relating to the e line, the aberration curve 80 relating to the F line, and the aberration curve 82 relating to the g line) shown in FIG. 17 are respectively illustrated by graphs.

The ordinate of the aberration curves in FIGS. 15 and 16 illustrate the image height as a percentage of the distance from the optical axis. In FIGS. 15 and 16, 100%, 80%, 70%, and 60% correspond to 0.620 mm, 0.496 mm, 0.434 mm, and 0.372 mm respectively. The ordinate of the aberration curve in FIG. 17 indicates the incidence height h (F number), corresponding at its maximum to F3.4. The abscissa in FIG. 17 shows the magnitude of the aberration.

As regards distortion, the absolute value of the amount of aberration reaches a maximum of 7.1562% in an image height position of 80% (image height 0.496 mm), and hence within a range of image height 0.620 mm and below, the absolute value of the aberration amount is held within 7.1562%.

As for astigmatism, the absolute value of the aberration amount on the meridional plane reaches a maximum of 0.0328 mm in an image height position of 100% (image height 0.620 mm), and hence within a range of image height 0.620 mm and below, the absolute value of the aberration amount is held within 0.0328 mm.

As for chromatic/spherical aberration, the absolute value of the aberration curve 82 relating to the g line reaches a maximum of 0.0217 mm at an incidence height h of 50%, and hence the absolute value of the aberration amount is held within 0.0217 mm.

It was thus learned that in all of the imaging lenses of the first through fourth embodiments, a sufficient performance for installation in a small camera using a CCD or CMOS as an imaging device is secured.

As is clear from the above description of the imaging lens of the present invention, by designing each of the lenses constituting the imaging lens so as to satisfy the conditional expressions (1) through (5), the problems to be solved by the present invention are solved. In other words, various aberrations are satisfactorily corrected, and an imaging lens having a sufficient back focus and a short optical length is obtained.

Note that in the embodiments described above, the plastic material ZEONEX 480β is used for the first lens, second lens, and third lens, but it goes without saying that plastic materials other than that cited in the embodiments, and also non-plastic materials such as glass or the like may be employed as long as the various conditions described in the embodiments and so on are satisfied.

As described above, according to the imaging lens of the present invention, various aberrations are satisfactorily corrected, and despite a short optical length, satisfactory image can be obtained and a sufficient back focus can be secured.

Also according to the imaging lens of the present invention, a cycloolefin plastic or a polycarbonate may be used as the lens material. Hence there is no need to employ expensive aspherical surface molded glass, thus enabling low-cost production and a reduction in weight.

As described above, the imaging lens of the present invention may be used as a camera lens for installation in portable telephones, personal computers, or digital cameras, and may also be satisfactorily applied as a camera lens for installation in PDAs (personal digital assistants), a camera lens for installation in toys comprising an image recognition function, and a camera lens for installation in monitoring, surveying, and crime-prevention devices and so on.

What is claimed is:

1. An imaging lens comprising a first lens L1, an aperture diaphragm S1, a second lens L2, and a third lens L3, and constituted such that said first lens L1, said aperture diaphragm S1, said second lens L2, and said third lens L3 are arranged in succession from the object side to the image side, wherein said first lens L1 is a resin lens having a positive refractive power and a meniscus shape in which the convex surface faces the object side, said second lens L2 is a resin lens having a positive refractive power and a meniscus shape in which the convex surface faces the image side, and said third lens L3 is a resin lens having a negative refractive power, both surfaces of said first lens L1 being aspherical, both surfaces of said second lens L2 being aspherical, and at least one surface of said third lens L3 being aspherical, and said imaging lens satisfying the following conditions, $$0.40 < r_1/r_2 < 0.65 \quad (1)$$

$$0.08 < D_2/f < 0.1 \quad (2)$$

$$0.2 < D_3/f < 0.3 \quad (3)$$

$$1.0 < d/f < 1.5 \quad (4)$$

$$0.4 < b_f/f < 0.6 \quad (5)$$

where f is the focal length of the entire lens system, $r_1$ is the radius of curvature of the object-side surface of the first lens L1 in the vicinity of the optical axis, $r_2$ is the radius of curvature of the image-side surface of the first lens L1 in the vicinity of the optical axis, $D_2$ is the interval between the first lens L1 and second lens L2, $D_3$ is the thickness at the center of the second lens L2, d is the distance from the object-side surface of the first lens L1 to the imaging surface, and $b_f$ is the distance from the image-side surface of the third lens to the imaging surface.

2. The imaging lens according to claim 1, wherein said first lens L1, said second lens L2, and said third lens L3 are formed from a material having an Abbe number within a range of thirty to sixty.

3. The imaging lens according to claim 1, wherein said first lens L1, said second lens L2, and said third lens L3 are formed using a cycloolefin plastic as a material.

* * * * *

UNITED STATES PATENT AND TRADEMARK OFFICE
CERTIFICATE OF CORRECTION

PATENT NO. : 6,989,947 B2
DATED : January 24, 2006
INVENTOR(S) : Satoshi Do

It is certified that error appears in the above-identified patent and that said Letters Patent is hereby corrected as shown below:

<u>Title page,</u>
Item [73], Assignees, should read:
-- Milestone Co., Ltd., Tokyo, (JP)
   Satoshi Do, Saitama, (JP) --.

Signed and Sealed this

Twenty-third Day of May, 2006

JON W. DUDAS
*Director of the United States Patent and Trademark Office*